United States Patent
Wang et al.

(10) Patent No.: US 10,291,451 B2
(45) Date of Patent: May 14, 2019

(54) PRACH DESIGN FOR LARGER CELL RADIUS

(71) Applicant: QUALCOMM Incorporated, San Diego, CA (US)

(72) Inventors: Renqiu Wang, San Diego, CA (US); Hao Xu, Beijing (CN); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/711,697

(22) Filed: Sep. 21, 2017

(65) Prior Publication Data

US 2018/0131547 A1    May 10, 2018

Related U.S. Application Data

(60) Provisional application No. 62/418,726, filed on Nov. 7, 2016.

(51) Int. Cl.
*H04L 27/26* (2006.01)
*H04W 74/08* (2009.01)
(Continued)

(52) U.S. Cl.
CPC .......... *H04L 27/2602* (2013.01); *H04B 1/00* (2013.01); *H04L 5/0053* (2013.01);
(Continued)

(58) Field of Classification Search
CPC . H04L 27/2602; H04L 5/0053; H04L 5/0094; H04L 5/0012; H04W 74/0833;
(Continued)

(56) References Cited

U.S. PATENT DOCUMENTS

2016/0150570 A1   5/2016 Wang et al.
2017/0373907 A1*  12/2017 Tan ................... H04L 5/0091
(Continued)

FOREIGN PATENT DOCUMENTS

WO   WO-2016004900 A1   1/2016
WO   WO-2016200238 A1   12/2016

OTHER PUBLICATIONS

Ericsson: "NB-IoT—NPRACH Configurations," 3GPP Draft; R1-161835, 3rd Generation Partnership Project (3GPP), Mobile Competence Centre; 650, Route Des Lucioles; F-06921; Sophia-Antipolis Cedex; France; 20160322-20160324; Mar. 16, 2016 (Mar. 16, 2016), pp. 1-14, XP051080952, Retrieved from the Internet: URL:http://www.3gpp.org/ftp/tsg_ran/WG1_RL1/TSGR1_AH/LTE_NB-IoT_1603/Docs/[retrieved on Mar. 16, 2016].
(Continued)

*Primary Examiner* — Faisal Choudhury
(74) *Attorney, Agent, or Firm* — Patterson & Sheridan, LLP

(57) ABSTRACT

Certain aspects of the present disclosure provide techniques for improving a physical random access channel (PRACH) design, for example, to support larger cell radius for communications in a wireless network. In aspects, a method of wireless communication by a user equipment (UE) is provided. The method generally includes receiving at least one configuration of a plurality of available narrowband physical random access channel (NPRACH) configurations or an indication of one of the plurality of NPRACH configurations. Each of the plurality of NPRACH configurations includes a different combination of at least two of a multi-level frequency hopping patter, cyclic prefix length, symbol group format, or tone spacing for NPRACH signals. The method also includes determining at least one resource within a plurality of available NPRACH resources according to the received configuration(s) or the received indication,
(Continued)

and transmitting a NPRACH signal using the determined at least one resource.

28 Claims, 14 Drawing Sheets

(51) Int. Cl.

| | | |
|---|---|---|
| *H04W 74/00* | (2009.01) | |
| *H04W 28/18* | (2009.01) | |
| *H04W 88/08* | (2009.01) | |
| *H04B 1/00* | (2006.01) | |
| *H04L 5/00* | (2006.01) | |
| *H04W 4/70* | (2018.01) | |

(52) U.S. Cl.
CPC .......... *H04L 5/0094* (2013.01); *H04W 28/18* (2013.01); *H04W 74/004* (2013.01); *H04W 74/008* (2013.01); *H04W 74/0833* (2013.01); *H04W 88/08* (2013.01); *H04L 5/0012* (2013.01); *H04W 4/70* (2018.02)

(58) Field of Classification Search
CPC ..... H04W 4/005; H04W 28/18; H04W 88/08; H04W 74/004; H04W 4/70; H04W 74/008; H04B 1/00
USPC .......................................................... 370/329
See application file for complete search history.

(56) References Cited

U.S. PATENT DOCUMENTS

2018/0124836 A1* 5/2018 Hong ................ H04W 74/0833
2018/0242101 A1* 8/2018 Lin ......................... H04W 4/02

OTHER PUBLICATIONS

Ericsson: "NB-IoT—Design Considerations for Single Tone Frequency Hopped NB-PRACH", 3GPP Draft; R1-160093, 3rd Generation Partnership Project (3GPP), Mobile Competence Centre, 650, Route Des Lucioles, F-06921, Sophia-Antipolis Cedex, France, vol. RAN WG1, No. Budapest, HU; Jan. 17, 2016, XP051053413, Retrieved from the Internet: URL:http://www.3gpp.org/ftp/Meetings_3GPP_SYNC/RAN1/Docs/ [retrieved on Jan. 17, 2016], 7 pages.

Ericsson: "NB-IoT—Single Tone Frequency NB-PRACH Design", 3GPP Draft; R1-160275, 3rd Generation Partnership Project (3GPP), Mobile Competence Centre, 650, Route Des Lucioles, F-06921, Sophia-Antipolis Cedex, France, vol. RAN WG1, No. St Julian's, Malta; Feb. 14, 2016, XP051053615, Retrieved from the Internet: URL: http://www.3gpp.org/ftp/Meetings_3GPP_SYNC/RAN1/Docs/ [retrieved on Feb. 14, 2016], 10 pages.

Intel Corporation: "On Random Access for NB-IoT", 3GPP TSG RAN WG1 NB-IoT Ad-Hoc Meeting, R1-160132, Jan. 17, 2016, XP051053451, Retrieved from the Internet: URL:http://www.3gpp.org/ftp/Meetings_3GPP_SYNC/RAN1/Docs, 8 pages.

International Search Report and Written Opinion—PCT/US2017/052990—ISA/EPO—dated Nov. 29, 2017.

ZTE: "Random Access Channel Design for NB-IoT", 3GPP Draft; R1-160056, 3rd Generation Partnership Project (3GPP), Mobile Competence Centre, 650, Route Des Lucioles, F-06921, Sophia-Antipolis Cedex, France, vol. RAN WG1, No. Budapest, HU; Jan. 17, 2016, XP051053377, Retrieved from the Internet: URL:http://www.3gpp.org/ftp/Meetings_3GPP_SYNC/RAN1/Docs/ [retrieved on Jan. 17, 2016], 6 pages.

Lin X., et al., "Random Access Preamble Design and Detection for 3GPP Narrowband IoT Systems", Networking and Internet Architecture, May 17, 2016, pp. 1-4.

Wang Y.P.E., et al., "A Primer on 3GPP Narrowband Internet of Things (NB-IoT)", Jun. 2016, pp. 1-8.

* cited by examiner

PRACH DESIGN FOR LARGER CELL RADIUS

CROSS-REFERENCE TO RELATED APPLICATIONS

This application claims the benefit of U.S. Provisional Patent Application Ser. No. 62/418,726, filed Nov. 7, 2016, which is assigned to the assignee hereof and hereby expressly incorporated by reference herein.

BACKGROUND

I. Field of the Disclosure

Aspects of the present disclosure relate generally to wireless communications systems, and more particularly, to techniques for designing a physical random access channel (PRACH), for example, to support a larger cell radius for communications in a network.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, eNB, gNB, access point (AP), radio head, transmission reception point (TRP), new radio (NR) BS, 5G Node B, etc.).

Some UEs may be considered machine type communication(s) (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. In general, MTC devices may include a broad class of devices in wireless communications including, but not limited to: Internet of Things (IoT) devices, Internet of Everything (IoE) devices, wearable devices and low cost devices.

Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to techniques for physical random access channel (PRACH) design to support a larger cell radius for communications in a network (e.g., such as a network that supports NB-IoT, massive MTC, and/or NR).

Certain aspects of the present disclosure provide a method for wireless communication that may be performed, for example, by a user equipment (UE). The method generally includes receiving at least one configuration of a plurality of available narrowband physical random access channel (NPRACH) configurations or an indication of one of the plurality of available NPRACH configurations. Each of the plurality of NPRACH configurations includes a different combination of at least two of a multi-level frequency hopping pattern, cyclic prefix length, symbol group format, or tone spacing for NPRACH signals. The method also includes determining at least one resource within a plurality of available NPRACH resources according to the received at least one configuration or the received indication. The method further includes transmitting a NPRACH signal using the determined at least one resource.

Certain aspects of the present disclosure provide an apparatus for wireless communication. The apparatus generally includes means for receiving at least one configuration of a plurality of available narrowband physical random access channel (NPRACH) configurations or an indication of one of the plurality of available NPRACH configurations. Each of the plurality of NPRACH configurations includes a different combination of at least two of a multi-level frequency hopping pattern, cyclic prefix length, symbol group format, or tone spacing for NPRACH signals. The apparatus also includes means for determining at least one resource within a plurality of available NPRACH resources according to the received at least one configuration or the received indication. The apparatus further includes transmitting a NPRACH signal using the determined at least one resource.

Certain aspects of the present disclosure provide an apparatus for wireless communication. The apparatus generally includes at least one processor and a memory coupled to the at least one processor. The at least one processor is configured to receive at least one configuration of a plurality of available narrowband physical random access channel (NPRACH) configurations or an indication of one of the plurality of available NPRACH configurations. Each of the plurality of NPRACH configurations includes a different combination of at least two of a multi-level frequency hopping pattern, cyclic prefix length, symbol group format, or tone spacing for NPRACH signals. The at least one processor is also configured to determine at least one resource within a plurality of available NPRACH resources according to the received at least one configuration or the received indication. The at least one processor is further configured to transmit a NPRACH signal using the determined at least one resource.

Certain aspects of the present disclosure provide a computer-readable medium having computer executable code stored thereon. The computer executable code generally includes code for receiving at least one configuration of a plurality of available narrowband physical random access channel (NPRACH) configurations or an indication of one of the plurality of available NPRACH configurations. Each of the plurality of NPRACH configurations includes a different combination of at least two of a multi-level frequency hopping pattern, cyclic prefix length, symbol group format, or tone spacing for NPRACH signals. The computer executable code also includes code for determining at least one resource within a plurality of available NPRACH resources according to the received at least one configuration or the received indication. The computer executable code further includes code for transmitting a NPRACH signal using the determined at least one resource.

Certain aspects of the present disclosure provide a method for wireless communication that may be performed, for example, by a base station (BS). The method generally includes determining a plurality of NPRACH configurations for transmission of a NPRACH signal. Each of the plurality of NPRACH configurations includes a different combination of at least two of a multi-level frequency hopping pattern, cyclic prefix length, symbol group format, or tone spacing for the NPRACH signal. The method also includes transmitting at least one of the NPRACH configurations or an indication of one of the NPRACH configurations to a UE.

Certain aspects of the present disclosure provide an apparatus for wireless communication. The apparatus generally includes means for determining a plurality of NPRACH configurations for transmission of a NPRACH signal. Each of the plurality of NPRACH configurations includes a different combination of at least two of a multi-level frequency hopping pattern, cyclic prefix length, symbol group format, or tone spacing for the NPRACH signal. The apparatus also includes means for transmitting at least one of the NPRACH configurations or an indication of one of the NPRACH configurations to a UE.

Certain aspects of the present disclosure provide an apparatus for wireless communication. The apparatus generally includes at least one processor and a memory coupled to the at least one processor. The at least one processor is configured to determine a plurality of NPRACH configurations for transmission of a NPRACH signal. Each of the plurality of NPRACH configurations includes a different combination of at least two of a multi-level frequency hopping pattern, cyclic prefix length, symbol group format, or tone spacing for the NPRACH signal. The at least one processor is also configured to transmit at least one of the NPRACH configurations or an indication of one of the NPRACH configurations to a UE.

Certain aspects of the present disclosure provide a computer-readable medium having computer executable code stored thereon. The computer executable code generally includes code for determining a plurality of NPRACH configurations for transmission of a NPRACH signal. Each of the plurality of NPRACH configurations includes a different combination of at least two of a multi-level frequency hopping pattern, cyclic prefix length, symbol group format, or tone spacing for the NPRACH signal. The computer executable code also includes code for transmitting at least one of the NPRACH configurations or an indication of one of the NPRACH configurations to a UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
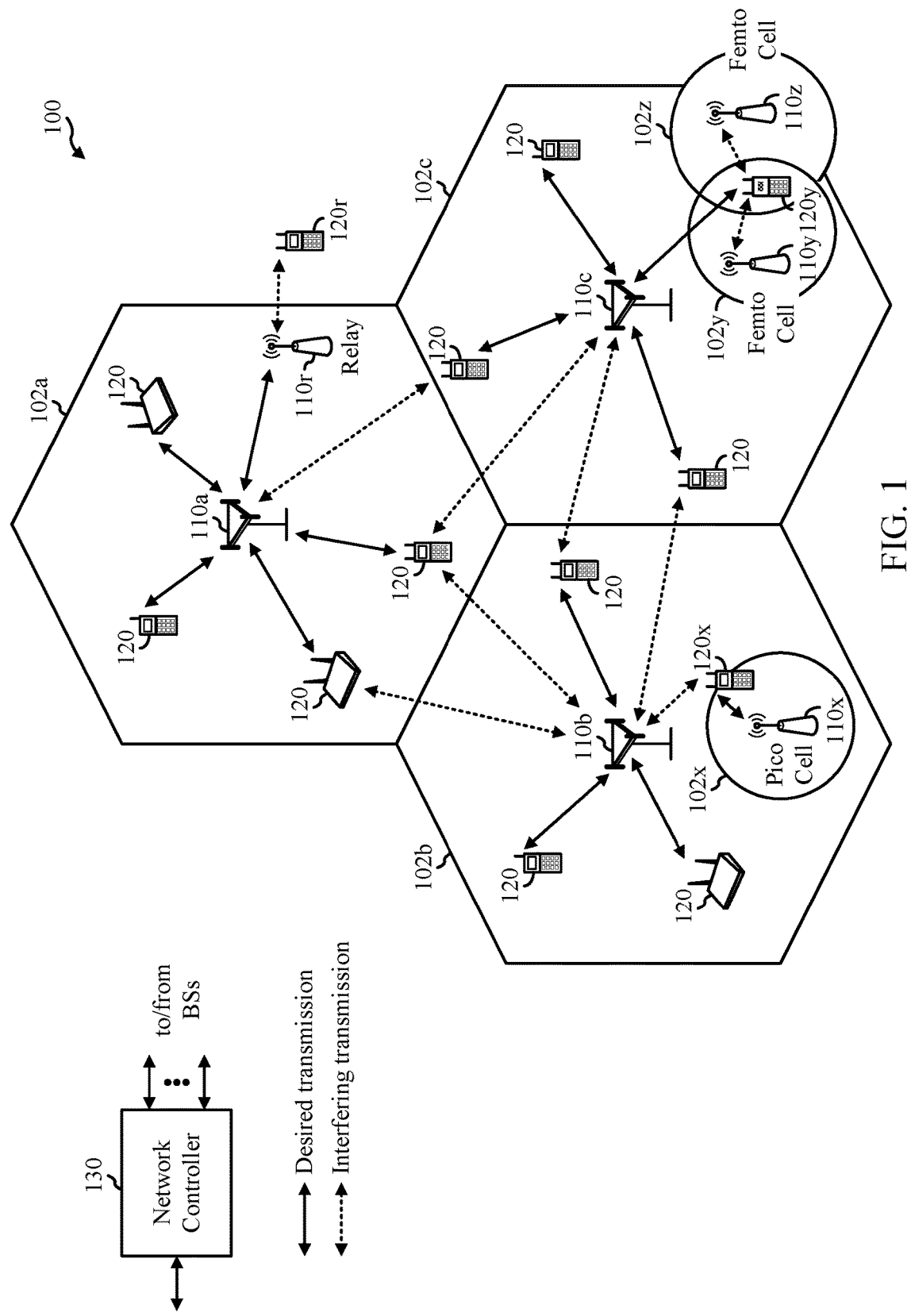
FIG. 1 is a block diagram conceptually illustrating an example telecommunications system, in accordance with certain aspects of the present disclosure.

Aspects of the present disclosure provide techniques and apparatus for extending a physical random access channel (PRACH) design to support larger cell radius for communications (e.g., NB-IoT communications, massive MTC, 5G communications, etc.).

According to certain aspects, a UE may receive a configuration of a plurality of available narrowband physical random access channel (NPRACH) configurations or an indication of one of the plurality of available NPRACH configurations (e.g., determined by a BS). Each of the plurality of NPRACH configurations may indicate a different combination of one or more of a multi-level frequency hopping pattern, cyclic prefix length, symbol group format, or tone spacing for a NPRACH signal. The UE may determine at least one resource (e.g., from a plurality of available NPRACH resources) to use for transmitting a NPRACH signal according to the configuration or indication. The UE may transmit the NPRACH signal to the BS using the determined at least one resource.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies (e.g., such as massive machine type communications (mMTC)).

Example Wireless Communications System

FIG. 1 illustrates an example wireless network 100 in which aspects of the present disclosure may be performed. For example, the wireless network may be a new radio or 5G network, and/or may support NB-IoT and/or massive machine type communication (mMTC). Base station (BS) 110 may comprise a eNB, gNB, gNodeB, a transmission reception point (TRP), Node B (NB), 5G NB, access point (AP), new radio (NR) BS, etc. In aspects, a UE 120 may receive a configuration of a plurality of available narrowband physical random access channel (NPRACH) configurations or an indication of one of the plurality of available NPRACH configurations determined by a base station (e.g., BS 110). Each of the plurality NPRACH configurations may include a different combination of one or more of a multi-level frequency hopping pattern, cyclic prefix length, symbol group format, or tone spacing for NPRACH signals. The UE 120 may determine at least one resource within a plurality of available NPRACH resources according to the configuration or indication. The UE 120 may transmit a NPRACH signal to the BS 110 using the determined at least one resource.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC devices, as well as other types of devices, may include Internet of Everything (IoE) or Internet of Things (IoT) devices, such as NB-IoT devices, and techniques disclosed herein may be applied to MTC devices, NB-IoT devices, as well as other devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment, for example, of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 20 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In some case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
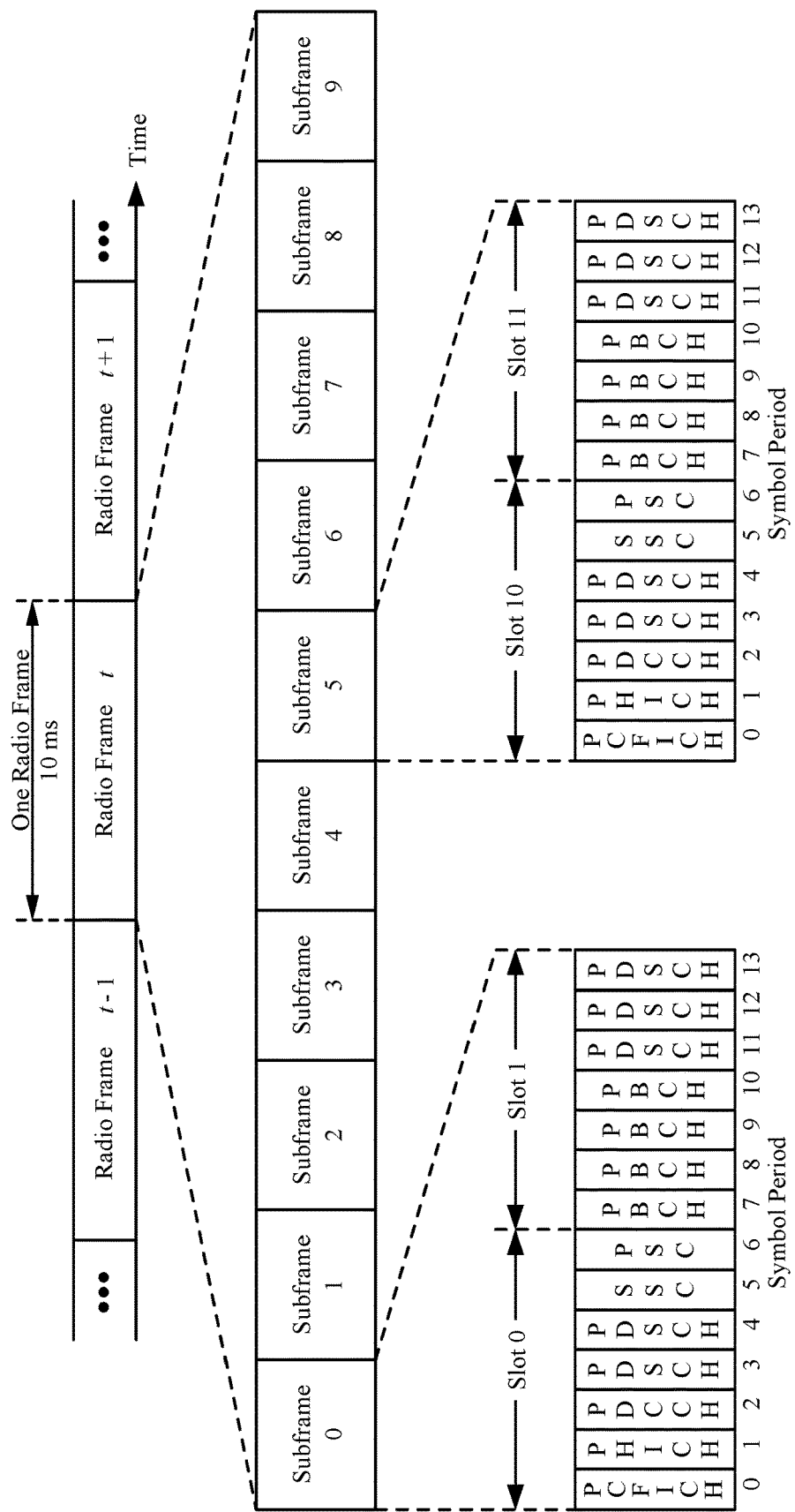
FIG. 2 is a block diagram conceptually illustrating an example downlink frame structure in a telecommunications system, in accordance with certain aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In certain systems (e.g., LTE), a BS may send a primary synchronization signal (PSS) and a secondary synchronization signal (SSS) for each cell in the BS. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The BS may send a Physical Broadcast Channel (PBCH) in symbol periods 0 to 3 in slot 1 of sub-frame 0. The PBCH may carry certain system information.

The BS may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The BS may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The BS may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The BS may send the PSS, SSS and PBCH in the center 1.08 MHz of the system bandwidth used by the Node B. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

A UE may be within the coverage of multiple BSs. One of these BSs may be selected to serve the UE. The serving BS may be selected based on various criteria such as received power, path loss, signal-to-noise ratio (SNR), etc.

In certain systems (e.g., such as NR or 5G systems), a BS may transmit these or other signals in these locations or in different locations of the subframe.

Figure 3:
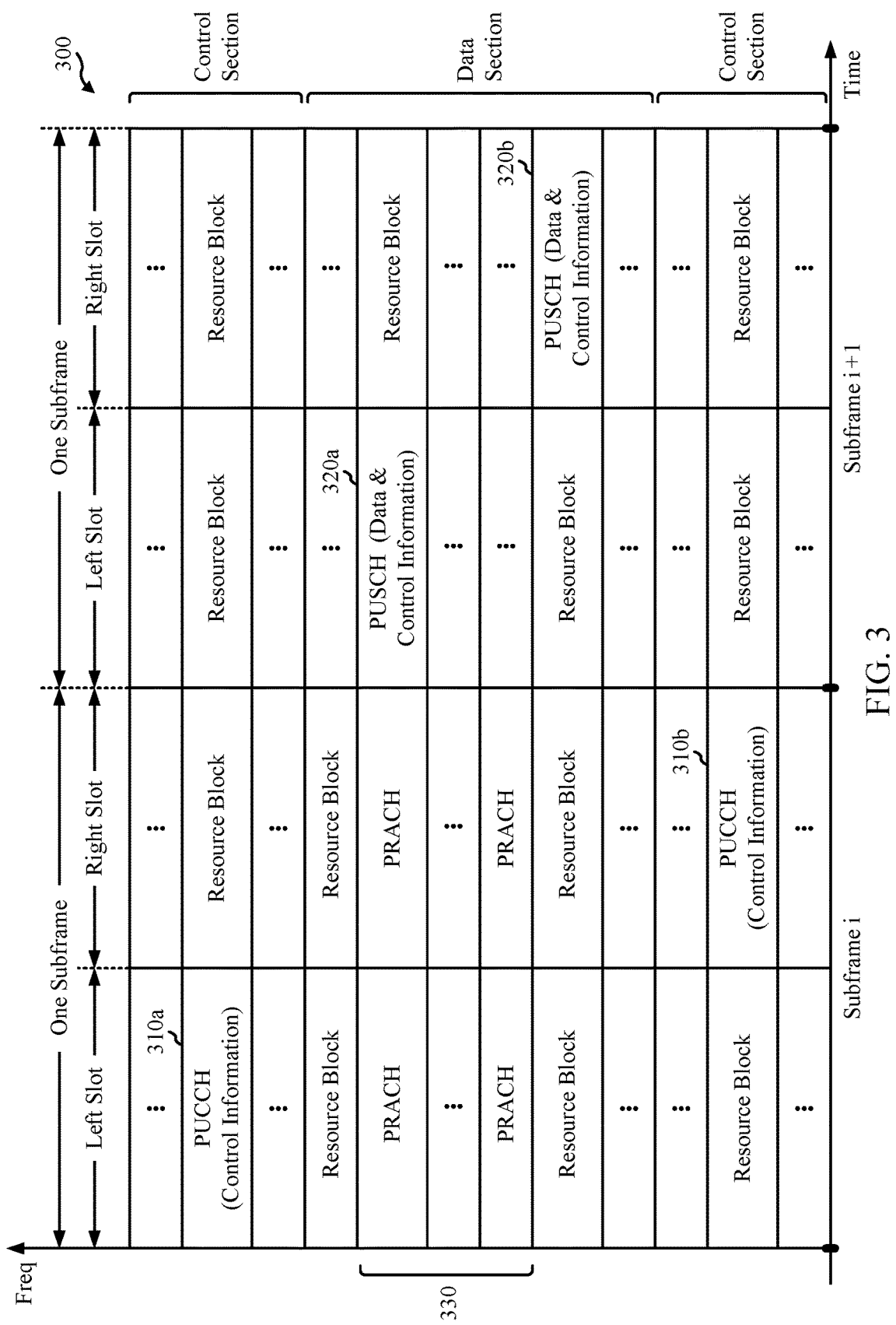
FIG. 3 is a diagram illustrating an example uplink frame structure in a telecommunications system, in accordance with certain aspects of the present disclosure.

FIG. 3 is a diagram 300 illustrating an example of an uplink (UL) frame structure in a wireless telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a BS. The UE may also be assigned resource blocks 320a, 320b in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble may occupy a bandwidth corresponding to six consecutive resource blocks. The starting frequency is specified by the network. That is, the transmission of the random access preamble may be restricted to certain time and frequency resources. There may be no frequency hopping for the PRACH. The PRACH attempt may be carried in a single subframe (1 ms) or in a sequence of few contiguous subframes and a UE can may make a single PRACH attempt per frame (10 ms).

In certain systems (e.g., such as NR or 5G systems), a BS may transmit these or other signals in these locations or in different locations of the subframe. While some aspects are described herein in connection with frames, subframes, slots, and/or the like, these aspects may equally apply to other types of wireless communication structures, which may be referred to using terms other than "frame," "subframe," "slot," and/or the like in 5G NR.

Figure 4:
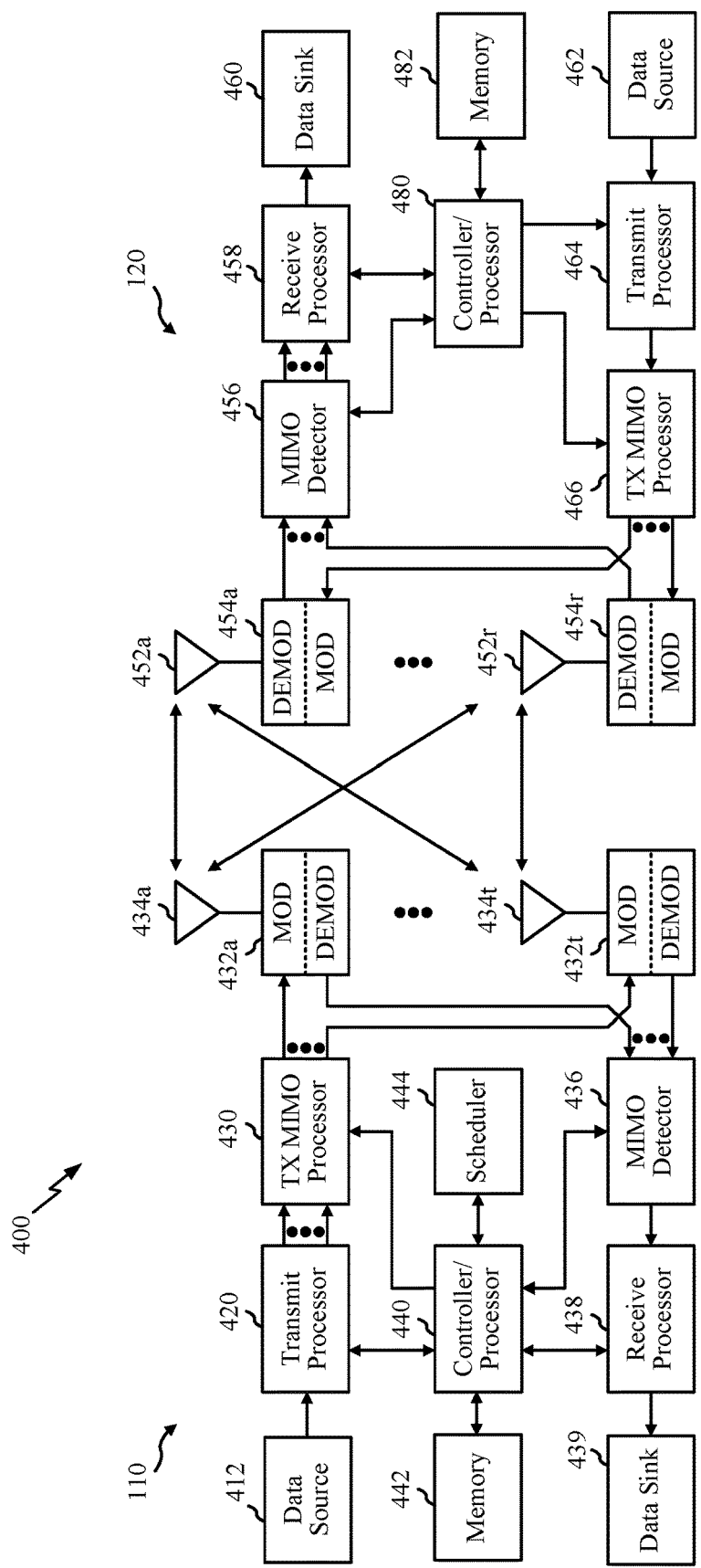
FIG. 4 is a block diagram conceptually illustrating a design of an example Node B and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 may be used to perform the operations described herein and illustrated with reference to FIG. 15 and/or antennas 434, processors 440, 420, 438, and/or controller/processor 440 of the BS 110 may be used to perform the operations described herein and illustrated with reference to FIG. 14.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of the functional blocks illustrated in FIG. 14 and/or other processes for the techniques described herein. The processor 480 and/or other processors and modules at the UE 120 may perform or direct, e.g., the execution of the functional blocks illustrated in FIG. 15 and/or other processes for the techniques described herein. The memories 442 and 482 may store data and program codes for the BS 110 and the UE 120, respectively. A scheduler 444 may schedule one or more UEs for data and/or control transmissions on the downlink and/or uplink.

Figure 5:
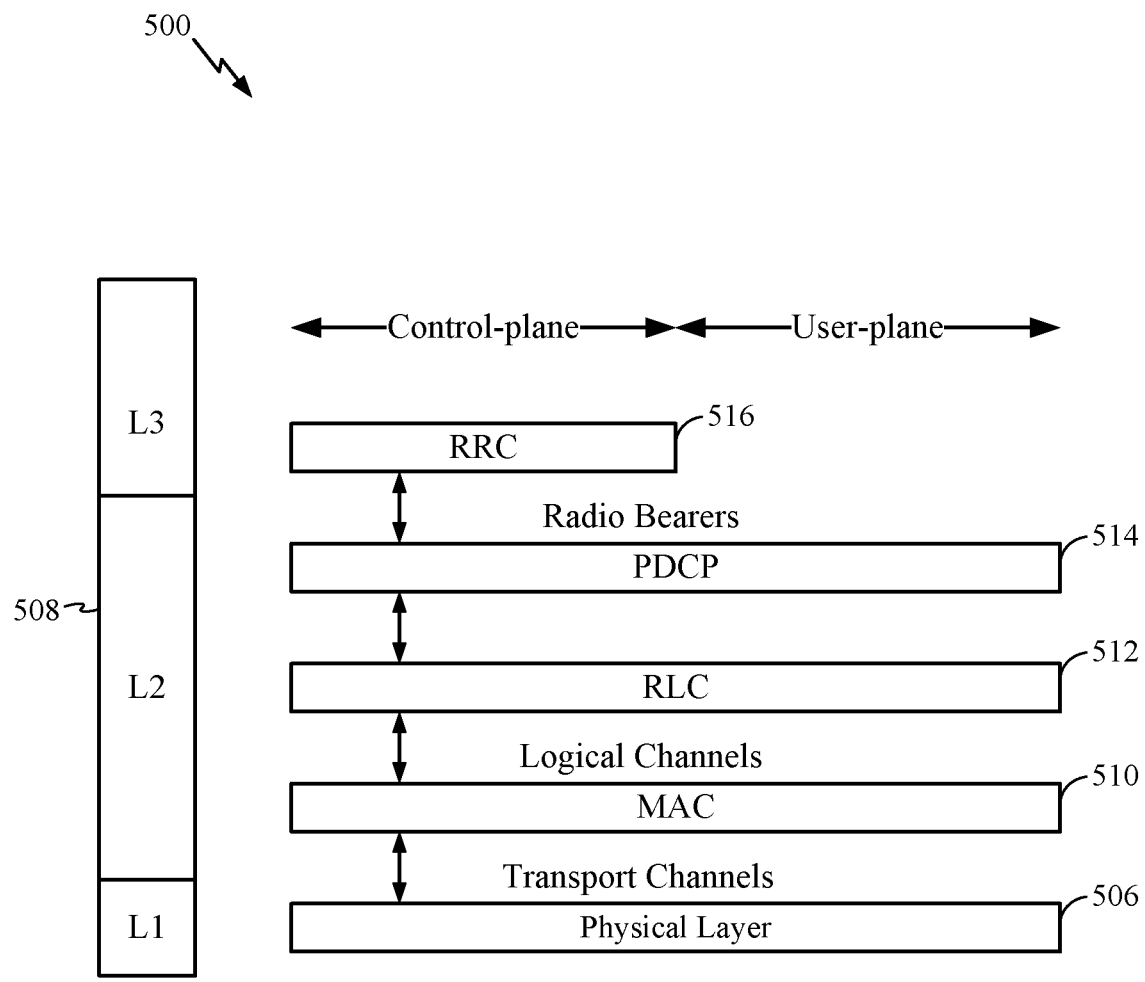
FIG. 5 is a diagram illustrating an example radio protocol architecture for the user and control planes, in accordance with certain aspects of the present disclosure.

FIG. 5 is a diagram 500 illustrating an example of a radio protocol architecture for the user and control planes in certain systems (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes, for example, a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
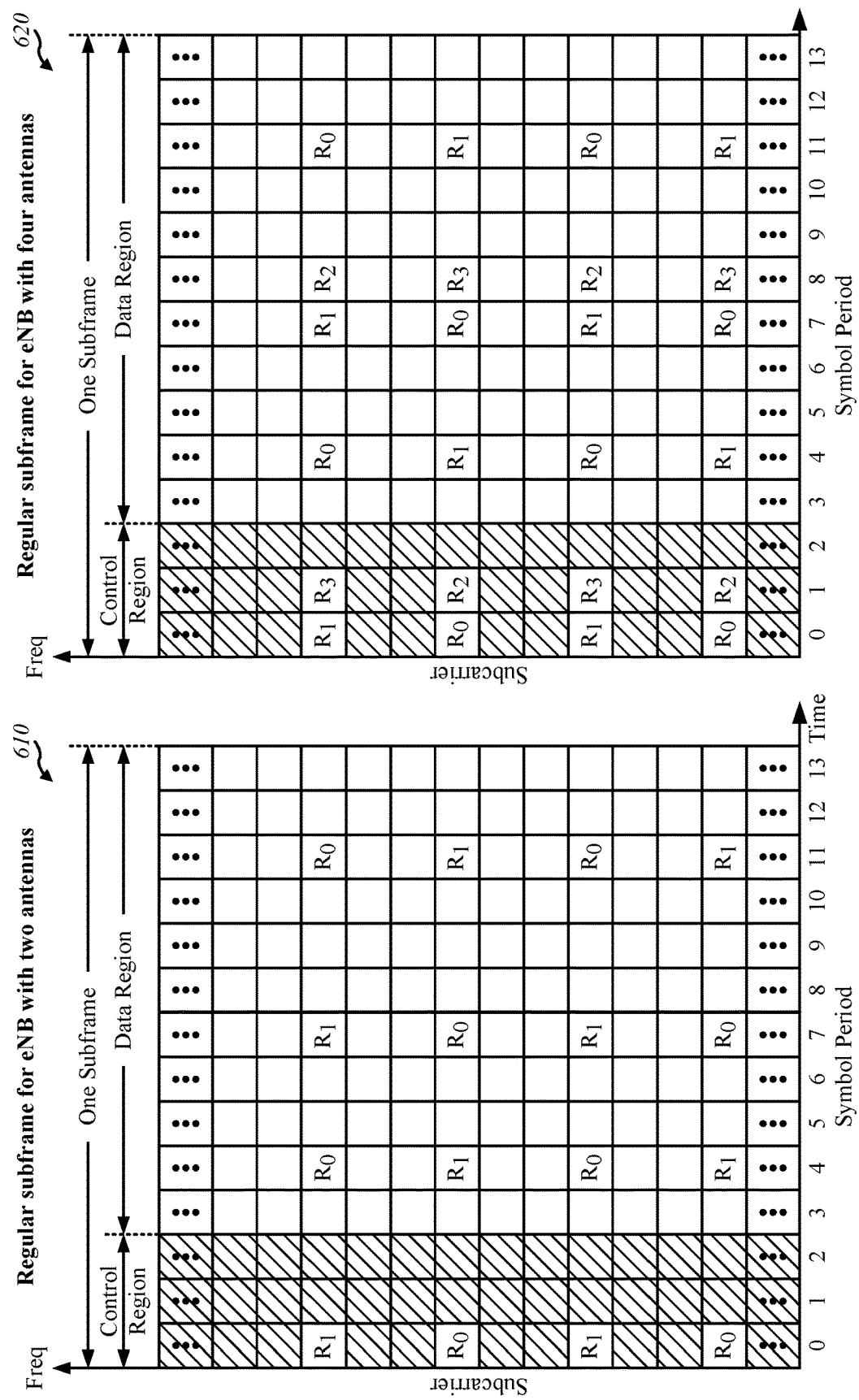
FIG. 6 illustrates an example subframe resource element mapping, in accordance with certain aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD (e.g., in LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, for example, all transmissions of the packet may be sent in subframes of a single interlace. For asynchronous HARQ, for example, each transmission of the packet may be sent in any subframe.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
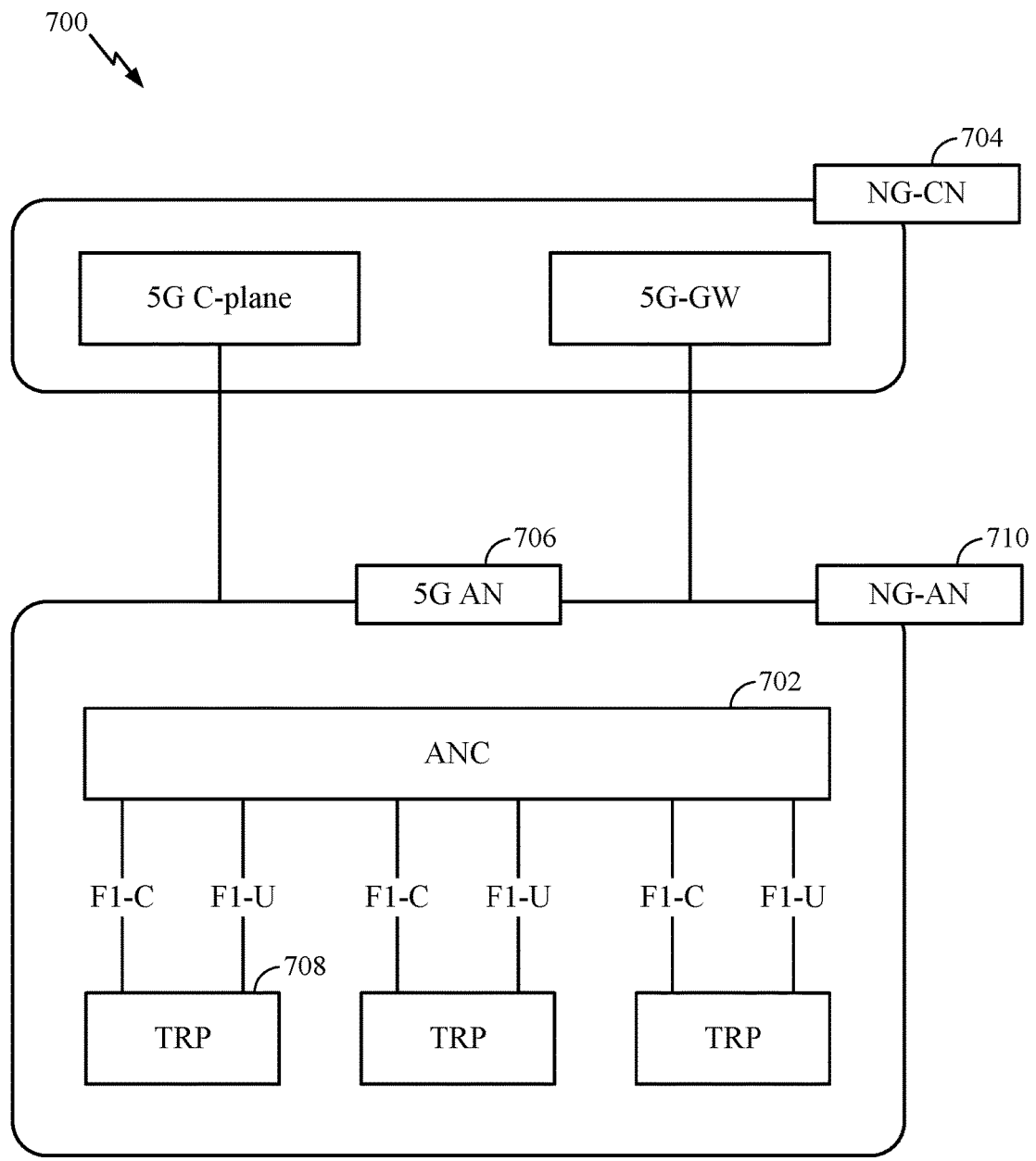
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/ or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
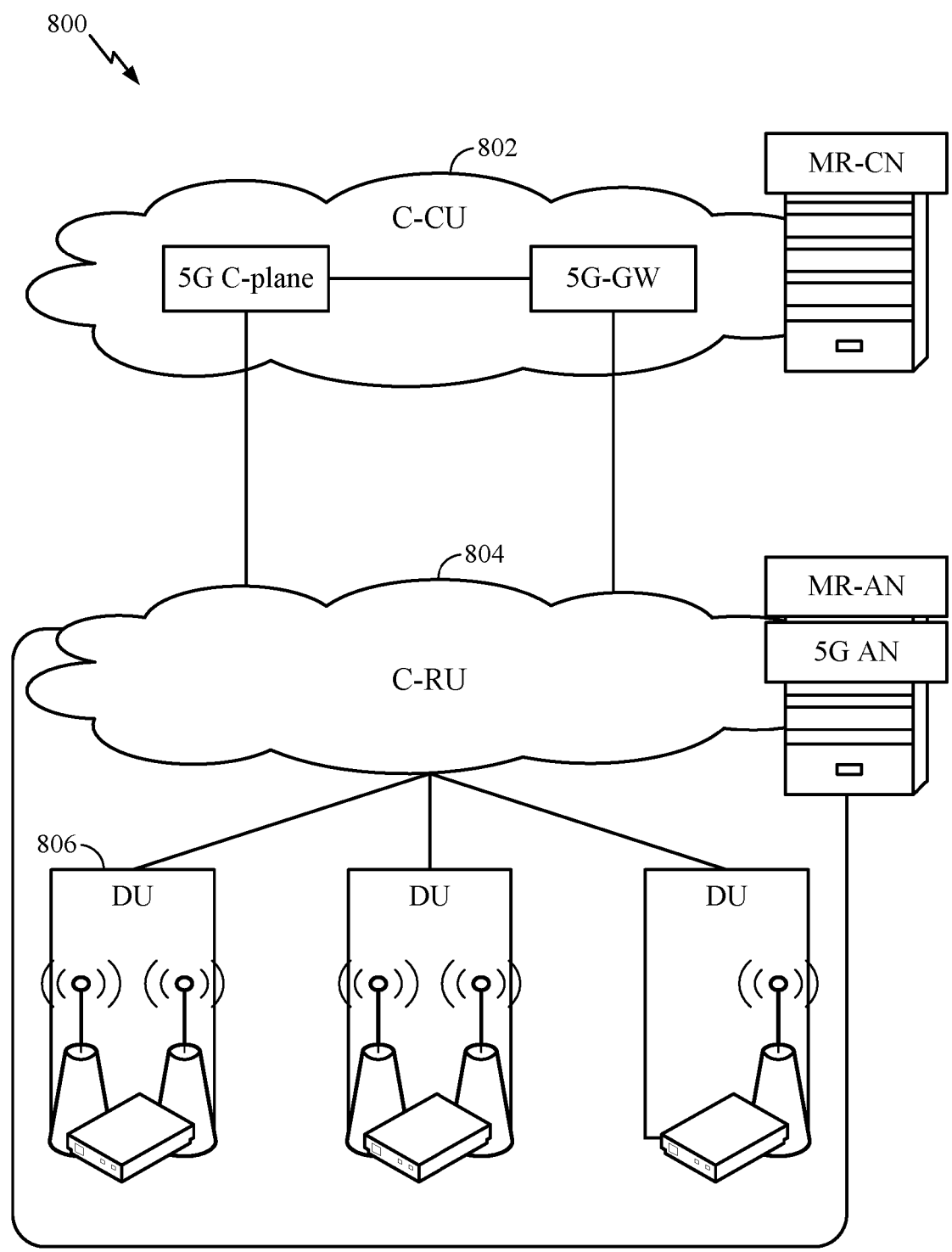
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
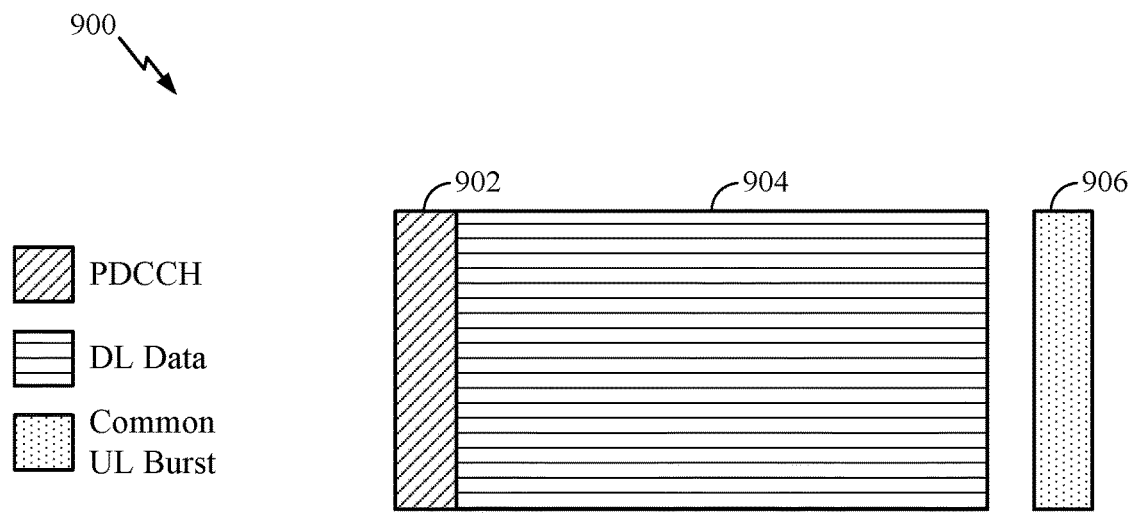
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a PDSCH.

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
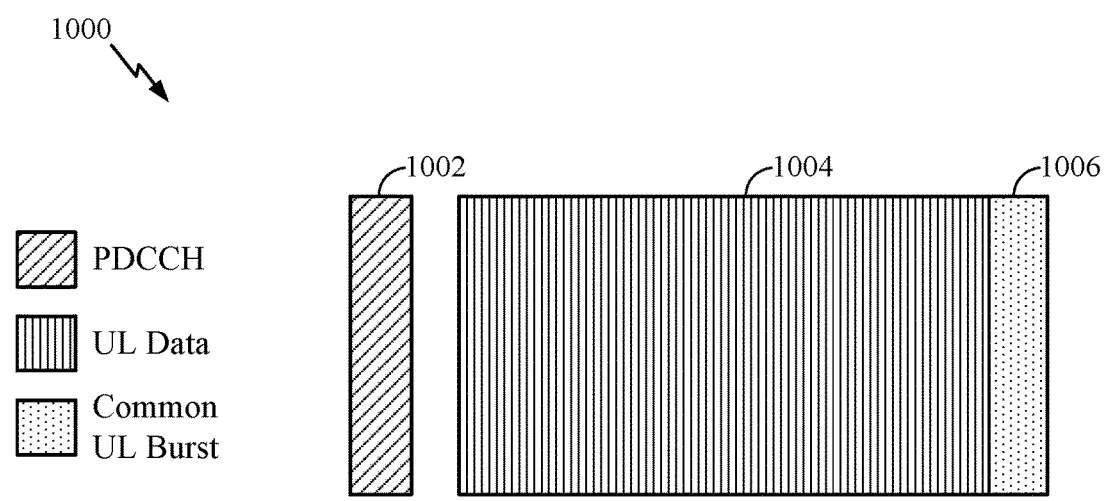
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 902 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a PDCCH.

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 906 described above with reference to FIG. 9. The common UL portion 1006 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (e.g., relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

Certain standards (e.g., LTE Release 13) may introduce support for various additional MTC enhancements, referred to herein as enhanced MTC (or eMTC). For example, eMTC may provide MTC UEs with coverage enhancements up to 20 dB. eMTC UEs may support narrowband operation while operating in a wider system bandwidth (e.g., 1.4/3/5/10/15/20 MHz). Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRBs). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

In the case of NB-IoT, the wireless communication network (e.g., LTE Release 13, or greater) may support deployments using one physical resource block (PRB) (e.g., 180 kHz+20 kHz guard band). NB-IoT deployments may utilize higher layer components of LTE and hardware to allow for reduced fragmentation and cross compatibility with, for example, NB-LTE and eMTC. In one case, NB-IoT may be deployed in-band and coexist with legacy GSM/WCDMA/LTE system(s) deployed in the same frequency band. Wideband LTE channel, for example, may be deployed in various bandwidths between 1.4 MHz to 20 MHz, and there may be a dedicated PRB for use by NB-IoT, or the RBs allocated for NB-IoT may be dynamically allocated (e.g., by an eNB). In an in-band deployment, one PRB, or 200 kHz, of a wideband LTE channel may be used for NB-IoT. In some deployments, NB-IoT may be deployed standalone. In a standalone deployment, one 200 kHz carrier may be used to carry NB-IoT traffic and GSM spectrum may be reused. In some deployments, NB-IoT may be deployed in the unused resource blocks within a LTE carrier guard-band. As described below, in some aspects, NB-IoT devices may use the one PRB of the NB-IoT for random access messages (e.g., PRACH signals).

NB-IoT may support single-tone and multi-tone assignments. For example, in uplink, 15 kHz or 3.75 kHz tone spacing may be used with single tone allocation or multiple tone allocation. For 15 kHz tone or subcarrier spacing, up to 12 tones or subcarriers can be used in a resource unit with single tone allocation and for 3.75 kHz tone spacing up to 48 tones can be used in a resource unit with single tone allocation.

Example Physical Random Access Channel for NB-IoT

In some cases, a UE and a cell may engage in an exchange of messages referred to as a random access channel (RACH) procedure. The UE, for example, may do so in order to connect with a cell to which it is not currently connected (e.g., to establish a connection with the network). In some cases, the UE may do so to achieve uplink synchronization. In a RACH procedure, a UE transmits a physical random access channel (PRACH) signal (or preamble) (sometimes referred to as Msg1 of a RACH procedure) in a set of transmission resources reserved for PRACH signals. The cell then responds to the PRACH signal with a random access response (RAR) message (e.g., sometimes referred to as Msg2 of a RACH procedure) carried on the downlink shared channel (DL-SCH). The UE responds to the RAR message with a RRC connection request message (e.g., sometimes referred to as Msg3 of a RACH procedure), and the cell responds with a contention resolution message (e.g., sometimes referred to as Msg4 of a RACH procedure). The UE is then connected with the cell.

In NB-IoT, a UE (e.g., IoT device) may transmit a PRACH preamble on a NB-IoT physical random access channel (NPRACH). As used herein, NPRACH generally refers to the time-frequency resource on which random access preambles are transmitted. In NB-IoT, a PRACH signal is based on single tone transmission with frequency hopping within a NPRACH. The PRACH signal may include four symbol groups and a single tone (e.g., or subcarrier) may used at every symbol group for transmission. Each symbol group includes a cyclic prefix and five symbols. Tone spacing of PRACH signals is 3.75 kHz. The symbols in a PRACH signal may use a cyclic prefix (CP) length of 66.7 microseconds (us) or 266.7 us. For a CP length of 66.7 us, the symbol group duration is about 1.5 milliseconds (ms), and for a CP length of 266.7 us, the symbol group duration is about 1.7 ms. The CP length of 66.7 us may be used for cells with radius below 10 km. The CP length of 266.7 us may be used for larger cells with radius below 40 km.

Figure 11:
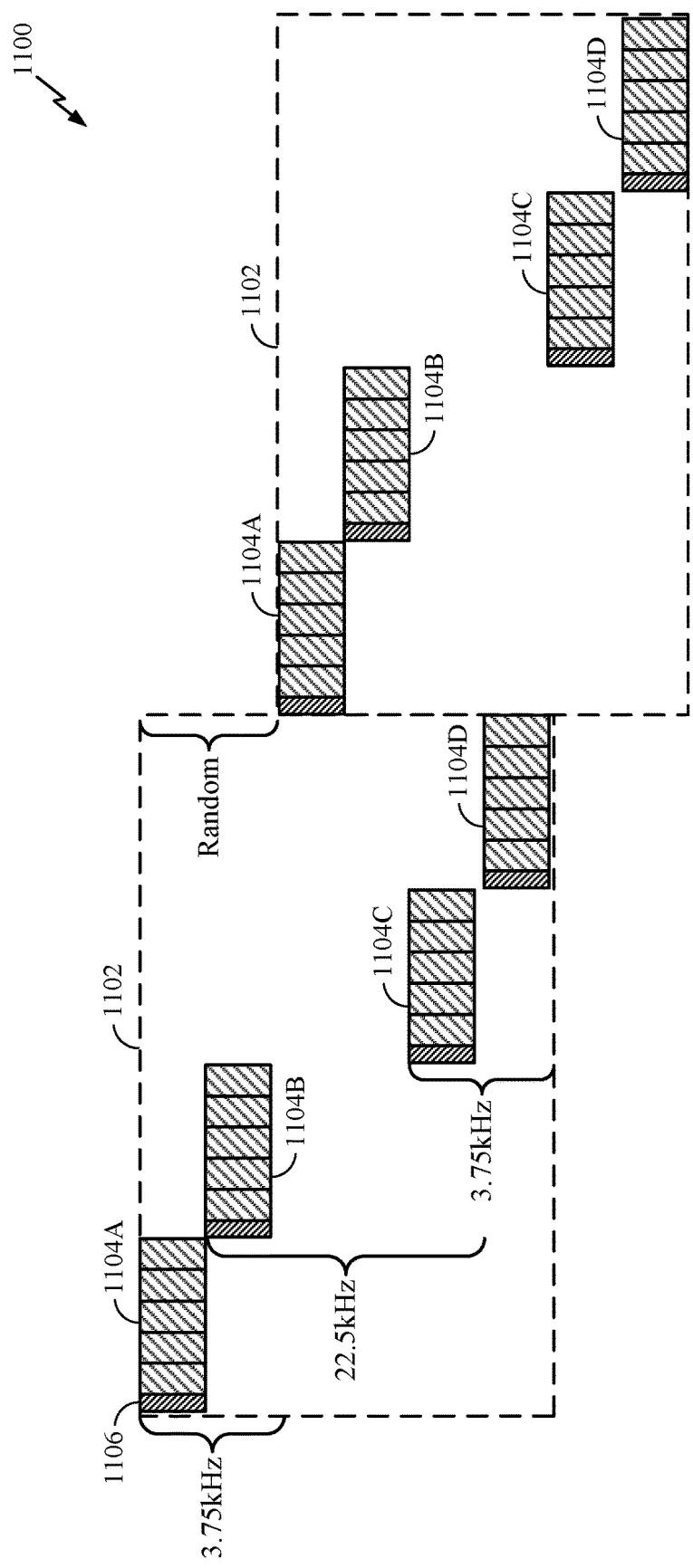
FIG. 11 illustrates an example of a current NPRACH design, in accordance with certain aspects of the present disclosure.

FIG. 11 illustrates one example of a PRACH signal 1100, in accordance with aspects of the present disclosure. As shown, the PRACH signal 1100 includes one or more repetitions 1102 of symbol groups 1104A-D. Each symbol group 1104 occupies a single tone and includes a cyclic prefix 1106 and five symbols. In some cases, the cyclic prefix 1106 may have a CP length of 266.7 us. In some cases, the cyclic prefix 1106 may have a CP length of 66.7 us. As shown, a first level single-subcarrier hopping (e.g., 3.75 kHz) may be used between the $1^{st}$ and $2^{nd}$ symbol groups (e.g., symbol group 1104A and symbol group 1104B) and between the $3^{rd}$ and $4^{th}$ symbol groups (e.g., symbol group 1104C and symbol group 1104D) in each repetition 1102 of the PRACH signal 1100. A second level six-subcarrier hopping (e.g., 22.5 kHz) may be used between the $2^{nd}$ and $3^{rd}$ symbol groups (e.g., symbol group 1104B and symbol group 1104C) in each repetition 1102 of the PRACH signal 1100. A pseudo-random frequency hopping may be applied between each repetition 1102 of the PRACH signal 1100.

Note that while the above discusses the single tone PRACH design in the context of NB-IoT, in some aspects, the above PRACH design can also be used for 5G technologies (e.g., such as 5G mMTC). mMTC, for example, may target same or similar coverages and power consumption levels as NB-IoT. In mMTC, a significantly large number of users (e.g., 1 million users per square kilometer or greater)

may attempt to access a given cell. In such cases, the single tone PRACH design may be used to meet such large coverage, provide large user multiplexing, etc. In some aspects, however, there may not be a constraint on the bandwidth of the PRACH signal in mMTC. For example, in some cases, the PRACH signal in mMTC may have a 200 kHz design (e.g., similar to NB-IoT) for backward compatibility. In some cases, the pseudo-random frequency hopping applied between repetitions of the PRACH signal in mMTC may go beyond 200 kHz (e.g., for greater frequency diversity).

Example Improved PRACH Design for Larger Cell Radius

The current NB-IoT PRACH design may not be able to support larger cell radius (e.g., greater than 40 km). For example, in general, the cell radius range of a given cell may be limited by the CP length and frequency hopping distance used for communications in the cell. In the case of CP length, in order to maintain the orthogonality of the random access transmissions on different subcarriers, the CP generally has to be long enough to accommodate the timing uncertainty in the cell, which can be as large as the maximum round-trip delay. Thus, in the case of NB-IoT PRACH, a cell size of up to 10 km can be supported with a CP length of 66.7 us, and a cell size of up to 40 km can be supported with a CP length of 266.7 us. The cell radius of a cell can additionally be affected by the minimum frequency hopping distance that is used for the PRACH signal. The frequency hopping distance, for example, can affect the resolution (e.g., range) of the time of arrival (ToA) estimation range (and in turn the estimation accuracy) that is used to determine the uplink timing advance. In the case of NB-IoT which supports a first level hopping distance of 3.75 kHz, the range of the cell radius may be limited to 40 km.

However, in some cases, communications in a wireless network (e.g., 4G/5G) may have to be supported for larger cell radius (e.g., 100 km, and greater). For example, in some wireless networks (e.g., LTE), communications may be supported up to 100 km.

Accordingly, aspects presented herein provide techniques for extending a PRACH design to support larger cell radius for communications (e.g., NB-IoT communications, 5G communications (e.g., such as mMTC), etc.). In particular, the techniques presented herein may extend the cell radius supported by given cell for PRACH transmission by modifying one or more parameters associated with the NPRACH configuration. For example, such parameters can include CP length, tone spacing, symbol group format, pseudo-random frequency hopping, multi-level frequency hopping pattern, etc.

In one aspect, techniques presented herein can extend cell radius support by at least one of increasing CP length relative to the CP length used in current designs or decreasing the frequency hopping distance (e.g., by reducing the minimum hopping distance, decreasing the tone spacing, etc.) relative to the frequency hopping distance used in current designs. For example, to support at least a 100 km cell radius, a CP length greater than 666.7 us can be used and a hopping distance and/or tone spacing less than 1.5 kHz can used.

Figure 12:
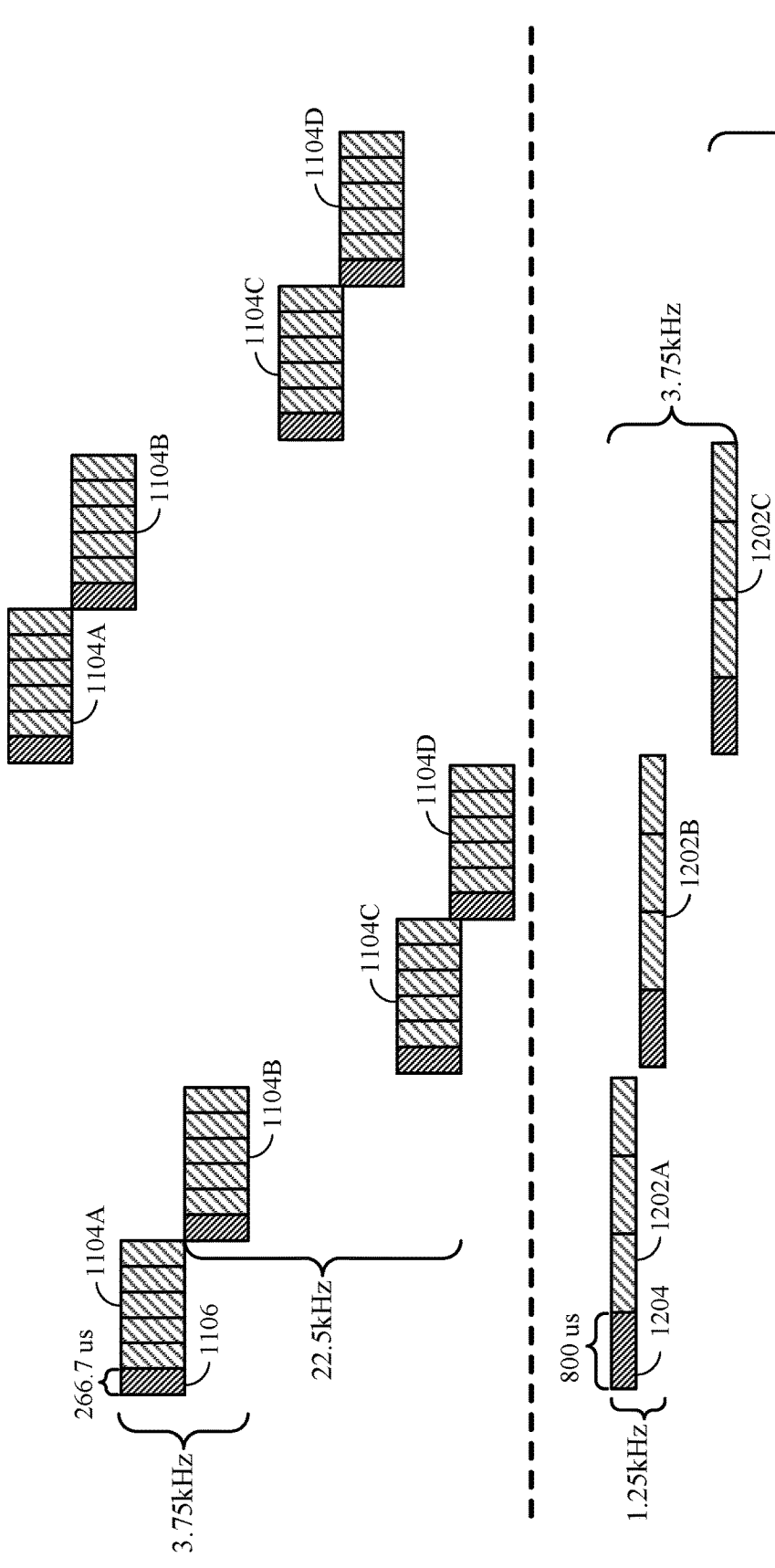
FIGS. 12-13 illustrate examples of improved NPRACH designs, in accordance with certain aspects of the present disclosure.

FIG. 12 illustrates one example of an improved NPRACH design, in accordance with certain aspects of the present disclosure. In particular, FIG. 12 shows (e.g., below the dotted line) a NPRACH design with a CP length of 800 us and tone spacing of 1.25 kHz, with respect to the current NPRACH design (e.g., shown above the dotted line) with a CP length of 266.7 us (e.g., symbol group duration of 1.7 ms). Note, in this example, the improved NPRACH design illustrates a single repetition of symbol groups 1202A-D relative to two repetitions 1102 of symbol groups 1104A-D in the current NPRACH design. Using a tone spacing of 1.25 KHz (e.g., in the improved NPRACH design) may scale with the current NPRACH tone spacing. That is, a tone spacing of 3.75 kHz in current NPRACH is three times the tone spacing of 1.25 kHz in the improved NPRACH design. The improved NPRACH design in FIG. 12 may be able to support a cell radius of up to 120 km.

In some aspects, the symbol group format in the improved NPRACH design can be different from the symbol group format (e.g., with a cyclic prefix and five symbols) in the current NPRACH design. For example, in one aspect, each symbol group can include a cyclic prefix and one transmission symbol (e.g., for a symbol group duration of 1.7 ms). Using a cyclic prefix and one transmission symbol for each symbol group may allow for backward compatibility with other NPRACH configurations (e.g. in which a CP length of 266.7 us is used). However, this symbol format can have a CP overhead of 50%.

In another aspect, as shown in FIG. 12, each symbol group 1202A-D can include a cyclic prefix 1204 and three transmission symbols (e.g., for a symbol group duration of 3.4 ms). The CP overhead associated with this symbol group format may be 25%. With this symbol group format, a single symbol group can be aligned (e.g., in time) with two symbol groups in the current NPRACH configuration. For example, as shown in FIG. 12, symbol group 1202A in the improved NPRACH design is roughly aligned (e.g., has a same duration) with the two symbol groups 1104A and 1104B of the first repetition 1102 in the current NPRACH configuration; symbol group 1202B in the improved NPRACH design is roughly aligned with the two symbol groups 1104C and 1104D of the first repetition 1102 in the current NPRACH configuration; symbol group 1202C in the improved NPRACH design is roughly aligned with the two symbol groups 1104A and 1104B of the second repetition 1102 in the current NPRACH configuration; and symbol group 1202D in the improved NPRACH design is roughly aligned with the two symbol groups 1104C and 1104D of the second repetition 1102 in the current NPRACH configuration.

In the improved NPRACH design shown in FIG. 12, a minimum frequency hopping distance of 1.25 kHz may be used between symbol groups. In some aspects, there may be three levels of hopping distance (e.g., a first level, second level, and third level). In such a case, the third level hopping distance may be larger than the second level hopping distance and the second level hopping distance may be larger than the first level hopping distance. As shown in FIG. 12, for example, a first level frequency hopping distance of 1.25 KHz (e.g., distance=1×single tone) is applied between the first symbol group 1202A and second symbol group 1202B; a second level frequency hopping distance of 3.75 kHz (e.g., distance=3×single tone) is applied between the second symbol group 1202B and third symbol group 1202C; and a third level frequency hopping distance of 22.5 kHz (e.g., distance=18×single tone) is applied between the third symbol group 1202C and fourth symbol group 1202D. Using a hopping distance such as the third level frequency hopping distance may help increase accuracy of timing estimation (e.g., as opposed to when such a large hopping distance is not employed).

Further, although not shown, in some aspects, there may be two levels of hopping distance (e.g., a first level and second level), and the second level hopping distance may be larger than the first level hopping distance. When applied to the symbol groups in FIG. 12, for example, the first level hopping distance may be applied between the first symbol group 1202A and the second symbol group 1202B, the second level hopping distance may be applied between the second symbol group 1202B and third symbol group 1202C, and the first level hopping distance may be applied between the third symbol group 1202C and fourth symbol group 1202D. The first level hopping distance may be equal to 1.25 kHz (e.g., distance=single tone) and the second level hopping distance may be equal to 7.5 kHz (e.g., distance=6*single tone). In some aspects, although not shown, a pseudo-random hopping may be applied between each repetition of the NPRACH signal in the improved NPRACH design shown in FIG. 12.

Figure 13:
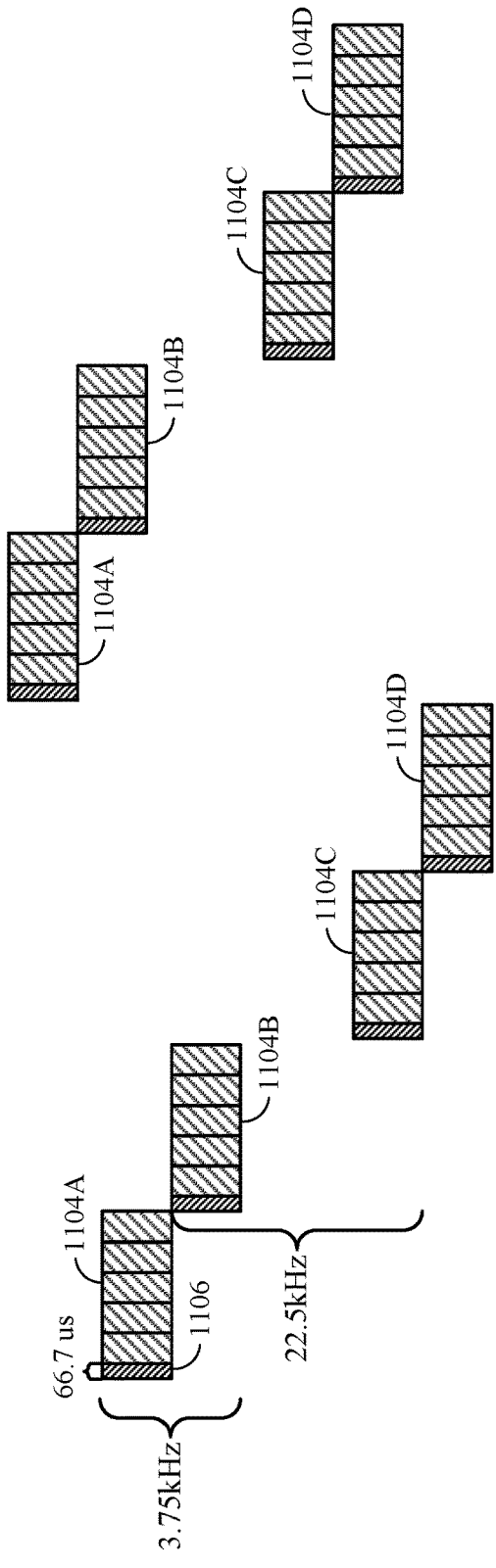
Figure 13:
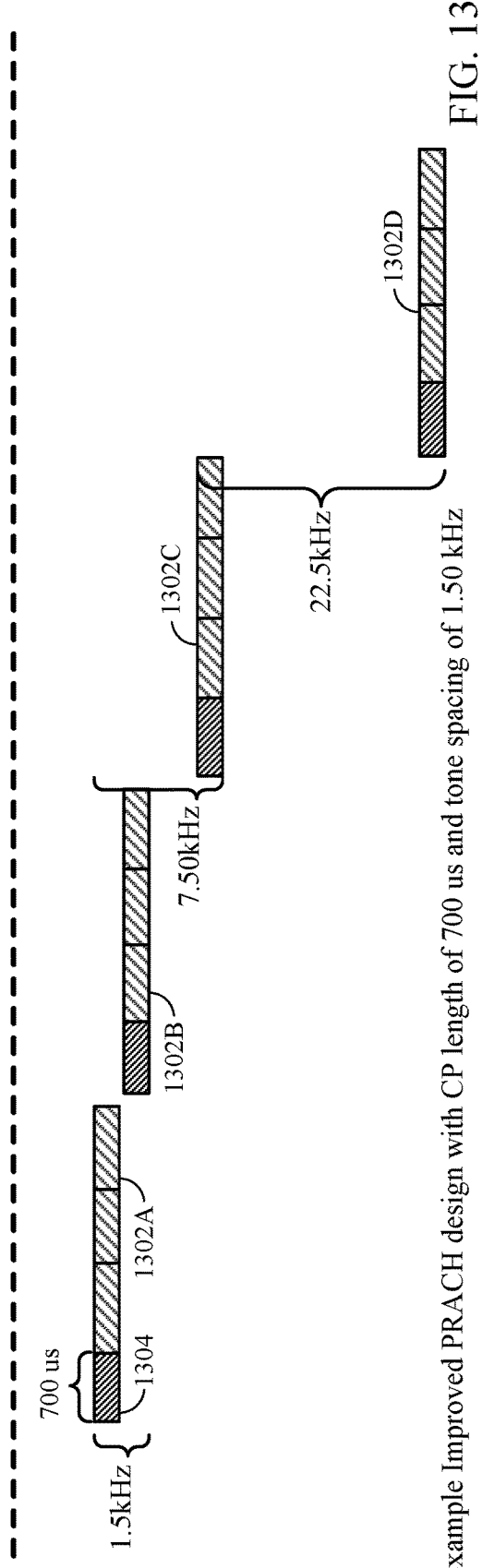

FIG. 13 illustrates another example of an improved NPRACH design, in accordance with certain aspects of the present disclosure. In particular, FIG. 13 shows (e.g., below the dotted line) a NPRACH design with a CP length of 700 us and tone spacing of 1.50 KHz, with respect to the current NPRACH design (shown above the dotted line) with a CP length of 66.7 us (e.g., symbol group duration of 1.4 ms). Note, in this example, the improved NPRACH design illustrates a single repetition of symbol groups 1302A-D relative to two repetitions 1102 of symbol groups 1104A-D in the current NPRACH design In some cases, a tone spacing of 1.5 KHz (e.g., in the improved NPRACH design) may scale with normal data tone spacing (e.g., in LTE); however, it may not scale with current NPRACH tone spacing. The improved NPRACH design in FIG. 13 may be able to support a cell radius of up to 100 km.

Similar to FIG. 12, different symbol group formats may be used with the improved NPRACH design in FIG. 13. For example, in one aspect, each symbol group can include a cyclic prefix and 1 transmission symbol for a symbol group duration of about 1.4 ms. This symbol group format may be backward compatible with other NPRACH configurations that use a CP length of 66.7 us. However, the CP overhead in this symbol group format can be close to 50%. In another aspect, as shown in FIG. 13, each symbol group 1302A-D can include a cyclic prefix 1304 and three transmission symbols for a symbol group duration of about 2.84 ms. With this symbol group format, each symbol group 1302 in the improved NPRACH design may roughly align with two symbol groups in the current NPRACH configuration (e.g., there may be a 150 us gap between the symbol formats in the different configurations). For example, as shown in FIG. 13, symbol group 1302A in the improved NPRACH design is roughly aligned (e.g., has a same duration) with the two symbol groups 1104A and 1104B of the first repetition 1102 in the current NPRACH configuration; symbol group 1304B in the improved NPRACH design is roughly aligned with the two symbol groups 1104C and 1104D of the first repetition 1102 in the current NPRACH configuration; symbol group 1302C in the improved NPRACH design is roughly aligned with the two symbol groups 1104A and 1104B of the second repetition 1102 in the current NPRACH configuration; and symbol group 1302D in the improved NPRACH design is roughly aligned with the two symbol groups 1104C and 1104D of the second repetition 1102 in the current NPRACH configuration.

In the improved NPRACH design shown in FIG. 13, a minimum frequency hopping distance of 1.50 kHz may be used between symbol groups. In some aspects, there may be three levels of hopping distance (e.g., a first level, second level, and third level). In such a case, the third level hopping distance may be larger than the second level hopping distance and the second level hopping distance may be larger than the first level hopping distance. As shown in FIG. 13, for example, a first level frequency hopping distance of 1.50 KHz (e.g., distance=1×single tone) is applied between the first symbol group 1302A and second symbol group 1302B; a second level frequency hopping distance of 7.50 kHz (e.g., distance=5×single tone) is applied between the second symbol group 1302B and third symbol group 1302C; and a third level frequency hopping distance of 22.5 kHz (e.g., distance=15×single tone) is applied between the third symbol group 1302C and fourth symbol group 1302D. The second and third levels of hopping distance may be aligned with 3.75 kHz (e.g., in the current NPRACH design).

Further, although not shown, there may be two levels of hopping distance (e.g., a first level and second level), and the second level hopping distance may be larger than the first level hopping distance. When applied to the symbol groups in FIG. 13, for example, the first level hopping distance may be applied between the first symbol group 1302A and the second symbol group 1302B, the second level hopping distance may be applied between the second symbol group 1302B and third symbol group 1302C, and the first level hopping distance may be applied between the third symbol group 1302C and fourth symbol group 1302D. The first level hopping distance may be equal to 1.50 kHz (e.g., distance=single tone) and the second level hopping distance may be equal to 9.0 kHz (e.g., distance=6×single tone). In some aspects, although not shown, a pseudo-random hopping may be applied between each repetition of the NPRACH signal in the improved NPRACH design shown in FIG. 13.

Note that the values of the parameters (e.g., cyclic prefix length, tone spacing, symbol group format, multi-level frequency hopping, etc.) used for the improved NPRACH designs in FIGS. 12-13 are included as reference examples of different parameters that can be used to design a NPRACH that supports a larger cell radius (e.g., compared to the existing NPRACH design). Those of ordinary skill in the art, however, will recognize that other values of such parameters can be used to extend the cell radius range.

For example, although the above disclosure describes symbol groups that include a cyclic prefix and one transmission symbol and symbol groups that include a cyclic prefix and three transmission symbols, the techniques herein allow for a NPRACH signal to include any number of symbol groups and/or any number of transmission symbols within a symbol group. That is, a NPRACH configuration can specify that a NPRACH signal includes N symbol groups, where each N symbol group includes M symbols in addition to a cyclic prefix (e.g., with N>0 and M>0). Further, although the multi-level hopping discussed above was applied to four symbol groups, the techniques presented herein allow for multi-level hopping to be used for more than four symbol groups (e.g., six symbol groups or more).

Still further, while each symbol group (for the improved NPRACH designs) shown in FIGS. 12-13 was aligned with two symbol groups of the current NPRACH design, in some cases, the symbol groups associated with the improved NPRACH designs may align to existing symbol groups in other ways. For example, in one case, one symbol group for an improved NPRACH design may be aligned with three symbol groups of an existing NPRACH design (or another NPRACH design/configuration). In one case, one repetition of a NPRACH signal (e.g., with one or more symbol groups) may align with multiple repetitions of an existing NPRACH signal (e.g., with four symbol groups). For example, in one case, one repetition of a NPRACH signal with six symbol groups may align with two repetitions of an existing NPRACH signal with four symbol groups in each repetition.

Figure 14:
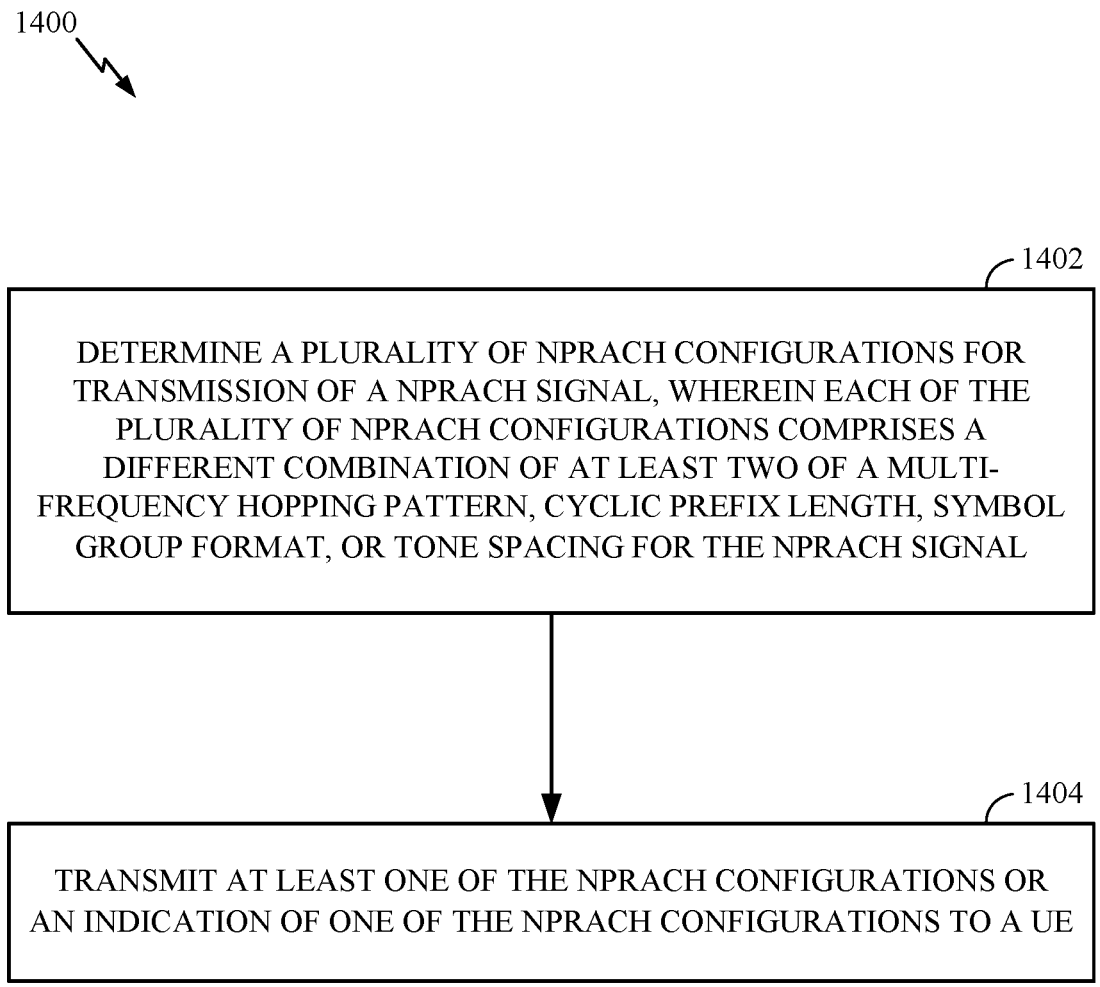
FIG. 14 is a flowchart illustrating example operations for wireless communications by a BS, in accordance with certain aspects of the present disclosure.

FIG. 14 is a flow diagram illustrating example operations 1400 for wireless communications, in accordance with certain aspects of the present disclosure. The operations 1400 may be performed, for example, by a base station (e.g., eNB 110).

The operations 1400 may begin, at 1402, where the BS determines a plurality of NPRACH configurations for transmission of a NPRACH signal (e.g., by a UE, such as a NB-IoT device, mMTC device, etc.). Each of the plurality of NPRACH configurations comprises a different combination of at least two of a multi-frequency hopping pattern, cyclic prefix length, symbol group format, or tone spacing for the NPRACH signal. At 1404, the BS transmits at least one of the NPRACH configurations or an indication of one of the NPRACH configurations to a UE.

In some aspects, the BS may provide an indication of at least one resource within a plurality of available NPRACH resources to be used for transmitting NPRACH signals according to the transmitted NPRACH configuration(s) or indicated NPRACH configuration. For example, in one case, the BS may provide the UE with a grant of a specific resource to transmit the NPRACH signal. The BS, in turn, may receive a NPRACH signal from the UE on the indicated at least one resource.

Figure 15:
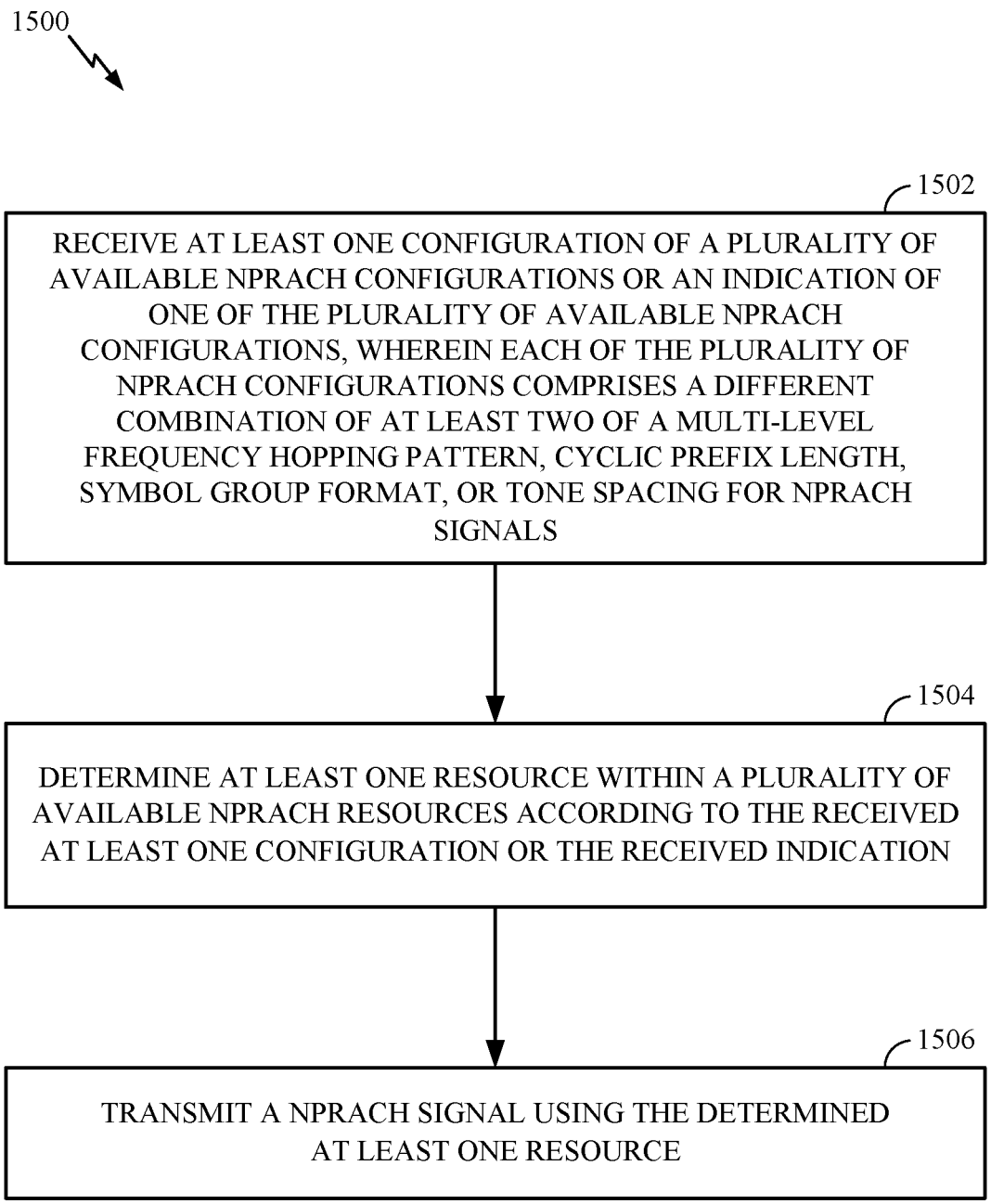
FIG. 15 is a flowchart illustrating example operations for wireless communications by a UE, in accordance with certain aspects of the present disclosure.

FIG. 15 is a flow diagram illustrating example operations 1500 for wireless communications, in accordance with certain aspects of the present disclosure. The operations 1500 may be performed, for example, by a user equipment (e.g., UE 120, such as a NB-IoT device, mMTC device, etc.).

The operations 1500 may begin, at 1502, where the UE receives (e.g., from a BS, such as eNB 110) at least one configuration of a plurality of available narrowband physical random access channel (NPRACH) configurations or an indication of one of the plurality of NPRACH configurations. Each of the plurality of NPRACH configurations includes a different combination of at least two of a multi-frequency hopping pattern, cyclic prefix length, symbol group format, or tone spacing for NPRACH signals. At 1504, the UE determines at least one resource, within a plurality of available NPRACH resources, according to the configuration(s) or indication. In one aspect, the UE may determine the at least one resource by pseudo-randomly or randomly selecting the resource from the plurality of available NPRACH resources. In one aspect, the at least one resource may be determined based on a grant received from the base station. At 1506, the UE transmits a NPRACH signal (e.g., to the BS, such as eNB 110) using the determined at least one resource.

In one aspect, the NPRACH signal may include one or more symbol groups in a single tone, and the one or more symbol groups (e.g., in the single tone) may hop within the available NPRACH resources according to the multi-level frequency hopping pattern. For example, as shown in FIGS. 12 and 13, there may be three levels of hopping distance, where each level is larger than the previous level. In another example, although not shown, there may be two levels of hopping distance. In one aspect, each symbol group may include a cyclic prefix and a single transmission symbol. In one aspect, each symbol group may include a cyclic prefix and three transmission symbols.

In some aspects, a first configuration of the plurality of NPRACH configurations may include a first symbol group format, a second NPRACH configuration of the plurality of NPRACH configurations may include a second symbol group format, and a symbol group having the second symbol group format may align with a plurality of symbol groups having the first symbol group format. Referring to FIGS. 12 and 13, for example, each symbol group 1202, 1302 in the improved NPRACH designs roughly aligns with two symbol groups in the current NPRACH design.

In one aspect, the UE may transmit one or more repetitions of the NPRACH signal, and a pseudo-random frequency hopping (e.g., within the set of NPRACH resources) may be used between each repetition of the NPRACH signal. In one aspect, the UE may receive the pseudo-random frequency hopping to use from the indicated NPRACH configuration.

In one aspect, an NPRACH configuration may indicate at least one of the cyclic prefix length is greater than 266.67 microseconds, a hopping level distance is less than 3.75 kilohertz, or a pseudo-random frequency hopping distance to use that causes the bandwidth of the NPRACH signal to be larger than 200 kilohertz (e.g., in the case of mMTC). For example, in some cases, the received NPRACH configuration may indicate a cyclic prefix length of 800 us and a tone spacing of 1.25 kHz. (e.g., as shown in FIG. 12), a cyclic prefix length of 700 us and a tone spacing of 1.5 kHz (e.g., as shown in FIG. 13), or other combinations of cyclic prefixes and tone spacings.

In one aspect, a first one or more of the NPRACH configurations are associated with a first cell radius of a cell comprising the BS, and a second one or more of the NPRACH configurations are associated with a second cell radius of the cell. Referring to FIGS. 12 and 13, for example, the NPRACH configuration in FIG. 12 may a cell radius up to 120 km and the NPRACH configuration in FIG. 13 may support a cell radius up to 100 km.

In one aspect, a first multi-level hopping pattern for a first NPRACH configuration of the plurality of NPRACH configurations may include two levels of hopping distance, a second multi-level hopping pattern for a second NPRACH configuration of the plurality of NPRACH configurations may include three levels of hopping distance, and at least one of the three levels of hopping distance used for the second NPRACH configuration may align with a level of hopping distance used for the first NPRACH configuration. Referring to FIGS. 12 and 13, for example, the second and third levels of hopping distance for the improved NPRACH designs may align with the level of hopping distance used for the current NPRACH design.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for indicating, means for transmitting, means for receiving, means for configuring, means for selecting, means for using, means for applying, means for causing, and/or means for providing may include one or more processors or other elements, such as the transmit processor 420, controller/processor 440, receiver processor 438, MOD/DEMOD 432 and/or antenna(s) 434 of the base station 110 illustrated in FIG. 4, and/or receiver processor 458, controller/processor 480, transmit processor 464, DEMOD/MOD 454 and/or antenna(s) 452 of the user equipment 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving at least one configuration of a plurality of available narrowband physical random access channel (NPRACH) configurations or an indication of one of the plurality of available NPRACH configurations, wherein each of the plurality of NPRACH configurations comprises a different combination of at least two of a multi-level frequency hopping pattern, cyclic prefix length, symbol group format, or tone spacing for NPRACH signals;
   determining at least one resource within a plurality of available NPRACH resources according to the received at least one configuration or the received indication; and
   transmitting a NPRACH signal using the determined at least one resource, wherein the NPRACH signal comprises one or more symbol groups in a single tone that hops within the plurality of available NPRACH resources according to the multi-level frequency hopping pattern.

2. The method of claim 1, wherein determining the at least one resource comprises:
   randomly selecting the at least one resource from the plurality of available NPRACH resources; or
   determining the at least one resource based on a grant received from a base station.

3. The method of claim 1, wherein the multi-level frequency hopping pattern comprises a first level hopping distance, a second level hopping distance, and a third level hopping distance.

4. The method of claim 3, wherein:
   the third level hopping distance is larger than the second level hopping distance; and
   the second level hopping distance is larger than the first level hopping distance.

5. The method of claim 3, wherein:
   the NPRACH signal comprises four symbol groups;
   the first level hopping distance is applied between a first group of the four symbol groups and a second group of the four symbol groups;
   the second level hopping distance is applied between the second group and a third group of the four symbol groups; and
   the third level hopping distance is applied between the third group and a fourth group of the four symbol groups.

6. The method of claim 1, wherein the multi-level frequency hopping pattern comprises a first level hopping distance and a second level hopping distance.

7. The method of claim 6, wherein the second level hopping distance is larger than the first level hopping distance.

8. The method of claim 6, wherein:
the NPRACH signal comprises four symbol groups;
the first level hopping distance is applied between a first group of the four symbol groups and a second group of the four symbol groups;
the second level hopping distance is applied between the second group and a third group of the four symbol groups; and
the first level hopping distance is applied between the third group and a fourth group of the four symbol groups.

9. The method of claim 1, wherein:
each symbol group comprises a cyclic prefix and a single transmission symbol; or
each symbol group comprises a cyclic prefix and three transmission symbols.

10. The method of claim 1, wherein:
transmitting the NPRACH signal comprises transmitting one or more repetitions of the NPRACH signal according to the received at least one configuration or the received indication;
a pseudo-random frequency hopping distance within the plurality of available NPRACH resources is used between each repetition of the NPRACH signal; and
the received at least one configuration or the received indication includes the pseudo-random frequency hopping distance to use.

11. The method of claim 1, wherein:
a first multi-level hopping pattern for a first NPRACH configuration of the plurality of NPRACH configurations comprises two levels of hopping distance;
a second multi-level hopping pattern for a second NPRACH configuration of the plurality of NPRACH configurations comprises three levels of hopping distance; and
at least one of the three levels of hopping distance used for the second NPRACH configuration aligns with a level of hopping distance used for the first NPRACH configuration.

12. The method of claim 1, wherein:
a first configuration of the plurality of NPRACH configurations comprises a first symbol group format;
a second configuration of the plurality of NPRACH configurations comprises a second symbol group format; and
a symbol group having the second symbol group format aligns with a plurality of symbol groups having the first symbol group format.

13. A method for wireless communication by a user equipment (UE), comprising:
receiving at least one configuration of a plurality of available narrowband physical random access channel (NPRACH) configurations or an indication of one of the plurality of available NPRACH configurations, wherein each of the plurality of NPRACH configurations comprises a different combination of at least two of a multi-level frequency hopping pattern, cyclic prefix length, symbol group format, or tone spacing for NPRACH signals;
determining at least one resource within a plurality of available NPRACH resources according to the received at least one configuration or the received indication, wherein the received at least one configuration or the received indication indicates at least one of the cyclic prefix length is greater than 266.67 microseconds, a hopping level distance is less than 3.75 kilohertz, or a pseudo-random frequency hopping distance to use that causes a bandwidth of the NPRACH signal to be larger than 200 kilohertz; and
transmitting a NPRACH signal using the determined at least one resource.

14. A method for wireless communication by a base station (BS), comprising:
determining a plurality of narrowband physical random access channel (NPRACH) configurations for transmission of a NPRACH signal, wherein each of the plurality of NPRACH configurations comprises a different combination of at least two of a multi-level frequency hopping pattern, cyclic prefix length, symbol group format, or tone spacing for the NPRACH signal;
transmitting at least one of the NPRACH configurations or an indication of one of the NPRACH configurations to a user equipment (UE);
providing an indication of at least one resource within a plurality of available NPRACH resources to be used for transmitting NPRACH signals according to the transmitted at least one of the NPRACH configurations or transmitted indication; and
receiving a NPRACH signal from the UE on the indicated at least one resource, wherein the NPRACH signal comprises one or more symbol groups in a single tone, and wherein the one or more symbol groups hop within the NPRACH resources according to the multi-level frequency hopping pattern.

15. The method of claim 14, wherein:
a first one or more of the NPRACH configurations are associated with a first cell radius of a cell comprising the BS;
a second one or more of the NPRACH configurations are associated with a second cell radius of the cell; and
the second cell radius is larger than the first cell radius.

16. The method of claim 15, wherein the second cell radius is at least 100 kilometers.

17. The method of claim 14, wherein:
a first multi-level hopping pattern for a first NPRACH configuration of the plurality of NPRACH configurations comprises two levels of hopping distance;
a second multi-level hopping pattern for a second NPRACH configuration of the plurality of NPRACH configurations comprises three levels of hopping distance; and
at least one of the three levels of hopping distance used for the second NPRACH configuration aligns with a level of hopping distance used for the first NPRACH configuration.

18. The method of claim 14, wherein the multi-level frequency hopping pattern comprises a first level hopping distance, a second level hopping distance, and a third level hopping distance.

19. The method of claim 18, wherein:
the third level hopping distance is larger than the second level hopping distance; and
the second level hopping distance is larger than the first level hopping distance.

20. The method of claim 18, wherein:
the NPRACH signal comprises four symbol groups;
the first level hopping distance is applied between a first group of the four symbol groups and a second group of the four symbol groups;

the second level hopping distance is applied between the second group and a third group of the four symbol groups; and the third level hopping distance is applied between the third group and a fourth group of the four symbol groups.

21. The method of claim 14, wherein:

the multi-level frequency hopping pattern comprises a first level hopping distance and a second level hopping distance; and the second level hopping distance is larger than the first level hopping distance.

22. The method of claim 21, wherein:

the NPRACH signal comprises four symbol groups;

the first level hopping distance is applied between a first group of the four symbol groups and a second group of the four symbol groups;

the second level hopping distance is applied between the second group and a third group of the four symbol groups; and the first level hopping distance is applied between the third group and a fourth group of the four symbol groups.

23. The method of claim 14, wherein:

each symbol group comprises a cyclic prefix and a single transmission symbol; or each symbol group comprises a cyclic prefix and three transmission symbols.

24. The method of claim 14, wherein:

receiving the NPRACH signal comprises receiving one or more repetitions of the NPRACH signal; and a pseudo-random frequency hopping distance within the plurality of available NPRACH resources is used between each repetition of the NPRACH signal.

25. The method of claim 24, wherein the transmitted at least one of the NPRACH configurations or the transmitted indication includes the pseudo-random frequency hopping distance to use.

26. A method for wireless communication by a base station (BS), comprising:

determining a plurality of narrowband physical random access channel (NPRACH) configurations for transmission of a NPRACH signal, wherein each of the plurality of NPRACH configurations comprises a different combination of at least two of a multi-level frequency hopping pattern, cyclic prefix length, symbol group format, or tone spacing for the NPRACH signal; and transmitting at least one of the NPRACH configurations or an indication of one of the NPRACH configurations to a user equipment (UE), wherein the transmitted at least one of the NPRACH configurations or the transmitted indication indicates at least one of the cyclic prefix length is greater than 266.67 microseconds, a hopping level distance is less than 3.75 kilohertz, or a pseudo-random frequency hopping distance to use that causes a bandwidth of the NPRACH signal to be larger than 200 kilohertz.

27. An apparatus for wireless communications, comprising:

means for receiving at least one configuration of a plurality of available narrowband physical random access channel (NPRACH) configurations or an indication of one of the plurality of available NPRACH configurations, wherein each of the plurality of NPRACH configurations comprises a different combination of at least two of a multi-level frequency hopping pattern, cyclic prefix length, symbol group format, or tone spacing for NPRACH signals;

means for determining at least one resource within a plurality of available NPRACH resources according to the received at least one configuration or the received indication; and means for transmitting a NPRACH signal using the determined at least one resource, wherein the NPRACH signal comprises one or more symbol groups in a single tone that hops within the plurality of available NPRACH resources according to the multi-level frequency hopping pattern.

28. An apparatus for wireless communications, comprising:

means for determining a plurality of narrowband physical random access channel (NPRACH) configurations for transmission of a NPRACH signal, wherein each of the plurality of NPRACH configurations comprises a different combination of at least two of a multi-level frequency hopping pattern, cyclic prefix length, symbol group format, or tone spacing for the NPRACH signal;

means for transmitting at least one of the NPRACH configurations or an indication of one of the NPRACH configurations to a user equipment (UE);

means for providing an indication of at least one resource within a plurality of available NPRACH resources to be used for transmitting NPRACH signals according to the transmitted at least one of the NPRACH configurations or transmitted indication; and means for receiving a NPRACH signal from the UE on the indicated at least one resource, wherein the NPRACH signal comprises one or more symbol groups in a single tone, and wherein the one or more symbol groups hop within the NPRACH resources according to the multi-level frequency hopping pattern.

* * * * *